US012756535B2

(12) United States Patent
Cason et al.

(10) Patent No.: US 12,756,535 B2
(45) Date of Patent: Oct. 6, 2026

(54) ASYNCHRONOUS SAMPLING RATE CONVERTER

(71) Applicant: Shure Acquisition Holdings, Inc., Niles, IL (US)

(72) Inventors: David Grant Cason, Palatine, IL (US); Jonathan Portwood, Vernon Hills, IL (US); Ravi Kiran Nalla, Hyderabad (IN)

(73) Assignee: Shure Acquisition Holdings, Inc., Niles, IL (US)

(*) Notice: Subject to any disclaimer, the term of this patent is extended or adjusted under 35 U.S.C. 154(b) by 73 days.

(21) Appl. No.: 19/013,620

(22) Filed: Jan. 8, 2025

(65) Prior Publication Data

US 2025/0226966 A1 Jul. 10, 2025

Related U.S. Application Data

(60) Provisional application No. 63/562,440, filed on Mar. 7, 2024, provisional application No. 63/619,129, filed on Jan. 9, 2024.

(51) Int. Cl.
*H04L 7/033* (2006.01)
*H04L 7/00* (2006.01)

(52) U.S. Cl.
CPC .......... *H04L 7/0331* (2013.01); *H04L 7/0029* (2013.01)

(58) Field of Classification Search
CPC ............................ H04L 7/0331; H04L 7/0029
USPC .................................................. 375/354–355
See application file for complete search history.

(56) References Cited

U.S. PATENT DOCUMENTS

| | | | | |
|---|---|---|---|---|
| 6,208,671 | B1 | 3/2001 | Paulos et al. | |
| 7,061,409 | B1 * | 6/2006 | Jantti | H03H 17/0628 341/61 |
| 7,262,716 | B2 | 8/2007 | Yu et al. | |
| 7,765,315 | B2 | 7/2010 | Batson et al. | |
| 7,876,791 | B2 | 1/2011 | Jung et al. | |
| 7,885,297 | B2 | 2/2011 | Won | |
| 7,949,015 | B2 | 5/2011 | Miljkovic et al. | |
| 8,369,973 | B2 * | 2/2013 | Risbo | H03H 17/0628 700/94 |
| 8,396,085 | B2 | 3/2013 | Jin | |

(Continued)

FOREIGN PATENT DOCUMENTS

| | | | |
|---|---|---|---|
| EP | 2355387 | A1 | 8/2011 |
| EP | 2323292 | B1 | 7/2016 |
| JP | 2001144694 | A | 5/2001 |

*Primary Examiner* — Emmanuel Bayard
(74) *Attorney, Agent, or Firm* — Banner & Witcoff, Ltd.

(57) ABSTRACT

Aspects of the disclosure relate to asynchronous sampling rate conversion of digital data. A sampling rate conversion module may use, for sampling rate conversion, a bank of subfilters corresponding to a polyphase interpolator. The specific subfilters and/or filter coefficients to be used for generation of output samples may be based on a rate control value. The rate control value may be determined based on a sampling rate used for input samples of the sampling rate converter and a read-out rate associated with samples, generated by the sampling rate converter, stored in an output buffer. A phase-locked loop (PLL) or other control loop may be used to maintain the rate control value at an appropriate level to negate the effects of temperature variations, noise, or any other system variations on the sampling rates.

20 Claims, 7 Drawing Sheets

(56) References Cited

U.S. PATENT DOCUMENTS

| | | | | |
|---|---|---|---|---|
| 8,767,898 | B2 | 7/2014 | Verhaegen et al. | |
| 9,569,169 | B2 | 2/2017 | Moore et al. | |
| 9,942,119 | B2 | 4/2018 | Krüger | |
| 10,534,573 | B2 | 1/2020 | El-Hoiydi et al. | |
| 10,582,461 | B2 | 3/2020 | Boehlke | |
| 2002/0056133 | A1 | 5/2002 | Fung et al. | |
| 2006/0168114 | A1 | 7/2006 | Glatron et al. | |
| 2007/0019802 | A1 | 1/2007 | Ubriaco et al. | |
| 2008/0055123 | A1* | 3/2008 | De Buys | H03H 17/0275 341/61 |
| 2009/0052431 | A1 | 2/2009 | Kroener et al. | |
| 2012/0246210 | A1* | 9/2012 | Pan | H03H 17/0628 708/313 |
| 2015/0200649 | A1* | 7/2015 | Trager | H03H 17/0628 341/61 |
| 2015/0244349 | A1* | 8/2015 | Bendel | G06F 5/06 341/61 |
| 2019/0349676 | A1* | 11/2019 | Chen | H04R 3/005 |

* cited by examiner

ASYNCHRONOUS SAMPLING RATE CONVERTER

CROSS-REFERENCE TO RELATED APPLICATIONS

This application claims the benefit of U.S. Provisional Patent Application No. 63/619,129, filed on Jan. 9, 2024; and U.S. Provisional Patent Application No. 63/562,440, filed on Mar. 7, 2024; both of which are fully incorporated herein by reference.

TECHNICAL FIELD

Aspects of the disclosure generally relate to digital signal processing. More specifically, aspects of this disclosure relate to methods, devices, and systems for modification of sampling rates corresponding to digital signals.

BACKGROUND

Digitization of an analog signal (e.g., an audio signal and/other any other continuous-time signal) is often a first step prior to additional signal processing, storage, and/or transmission. Signal digitization may comprise a sampling step in which an analog signal may be sampled, at a specific sampling rate (also known as sampling frequency), to generate a series of data samples that together represent magnitudes of the analog signal as observed at specified times instances. Sampling of an analog signal may be followed by a quantization step by which the values of the data points may be rounded off to a nearest quantized level. Digital signal processing and/or communication may comprise one or more additional processes such as filtering, encoding, modulation, packetization, demodulation, decoding, etc.

A signal processor (e.g., at a receiving device) may receive and process digital signals that are generated based on a specific sampling rate. However, in many scenarios, the signal processor may operate at a sampling rate that is different from a sampling rate used to generate the digital signals. For example, the signal processor may process received samples at a higher (or lower) rate than a rate used to generate the samples at a transmitting device. Mismatched sampling rates may result in signal distortion and/or buffer overflow/underflow at the receiving device. To ensure synchronization between the two devices, a sampling rate converter may be used to convert, without loss of information, digital data corresponding to a first sampling rate to digital data corresponding to a second sampling rate.

SUMMARY

The following summary presents a simplified summary of certain features. The summary is not an extensive overview and is not intended to identify key or critical elements.

Various examples herein describe digital signal processing to change a sampling rate of digital data. The sampling rate change may be performed using an asynchronous sampling rate converter (ASRC). The ASRC may perform sampling rate conversion based on a ratio of a input data packet rate (e.g., packet write rate) used for generation of the digital data and a output data packet rate (e.g., packet read rate) at a buffer storing converted digital data. For example, the ASRC may determine, based on time stamps associated with packets of a data signal, the packet write rate associated with input data packets. The ASRC may determine, based on a local clock, the packet read rate associated with output data packets. The ASRC may determine, based on a ratio of the packet write rate and the packet read rate, a rate control value. The ASRC may generate, based on the rate control value, a first quantity of output data samples (e.g., in one or more output data packets) based on a second quantity of input data samples (e.g., in one or more input data packets). For example, a polyphase interpolator may be used for the generation of output data samples based on input data samples. A rate of generation of the first quantity of output data samples may correspond to the packet read rate.

Additional aspects herein describe the use an interpolation technique to determine filter coefficients for a polyphase interpolator in scenarios where the rate control value is not an integer ratio. Further, a phase-locked loop (PLL) or other control loop may be used to adjust the rate control value at an appropriate level to negate the effects of temperature variations and/or noise on the sampling rate/sample read-out rate.

These and other features and advantages are described in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
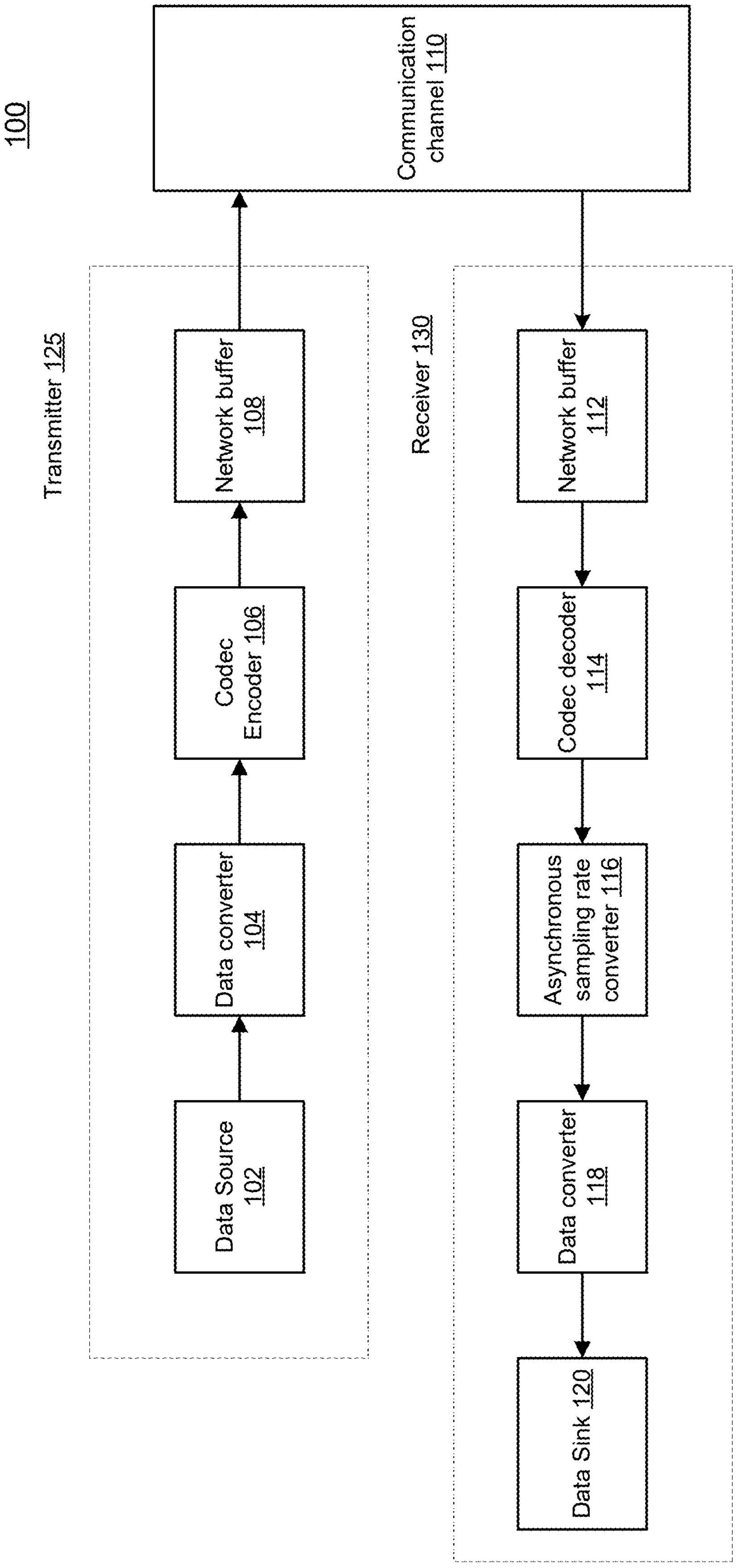
FIG. 1 shows an example system for generating and processing digital data.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. It is noted that various connections between elements are discussed in the following description. It is noted that these connections are general and, unless specified otherwise, may be direct or indirect, wired or wireless, and that the specification is not intended to be limiting in this respect.

As described above, sampling rate converters may be used to modify a sampling rate of digital data. For example, samples of digital data corresponding to a first sampling rate (e.g., as generated at a transmitter) may be processed to generate samples, of the same digital data, at a second sampling rate (e.g., at a receiver). The second sampling rate may be a rate at which the samples may be processed at the receiver. A hardware-based approach may be used for sampling rate conversion. Such a hardware-based approach may require the use of additional synchronization hardware to ensure that the transmitter and the receiver operate at a same frequency and hence utilize a same sampling rate. The requirement of additional synchronization hardware may add to cost and complexity of a sampling rate conversion system.

Various examples herein describe the use of a software-based approach for sampling rate conversion. The software-based approach may apply asynchronous sampling rate conversion techniques as described herein which may enable elimination of separate synchronization hardware in the sampling rate conversion process. For example, an asynchronous sampling rate converter (ASRC) may use time stamps as included in packets (e.g., as received from a transmitter) or generated by the receiver upon reception of said packets to determine a packet write rate as used for generation of the packets. Additionally, the ASRC may use local times associated with output packets (e.g., as output by the ASRC) being read out from a buffer to determine a packet read rate used at the receiver. The ASRC may determine a rate control value based on the packet write rate used for generation of packets and the packet read rate used at the receiver. The rate control value may be used to control operation of a rate conversion module (e.g., comprising a polyphase interpolator). The rate conversion module may perform the sampling rate conversion to generate output samples using input samples. A clock used for generation of packet time stamps need not be synchronized with the clock used for determining the local times associated with packets being written. Not requiring any separate synchronization hardware may simplify the sampling rate conversion process and may provide additional flexibility.

Additional examples herein describe techniques to achieve sampling rate conversion with arbitrary ratios or ratios that cannot be resolved as integer ratios at the ASRC. Specifically, coefficients of subfilters of a polyphase interpolator may be determined using coefficient interpolation techniques based on a Taylor's series algorithm. A phase-locked loop (PLL) or other control loop may dynamically adjust the rate control value to accommodate the effects of temperature variations, noise, or any other variations in the system on the sampling rate used for packet generation and/or the sampling rate used at the receiver.

FIG. 1 shows an example system 100 for generating and processing digital data. In an example, the transmitter 125 may correspond to an audio input device (e.g., a microphone, a transceiver of a musical instrument, etc.) and the receiver 130 may be an audio output device (e.g., a speaker, a headphone), and/or any digital device capable of processing and storing received digital data. While the example digital system 100 is described in relation to generation and processing of digital data based on analog audio signals, the example digital system 100 may be applied for processing of any other type of analog and/or digital signals. For example, the signals may comprise computer-generated signals (e.g., corresponding to telemetry data, any other band-limited data) within an audio band (or within any other frequency band).

Further, while the example digital system 100 illustrates the use of a transmitter 125 and a receiver 130, the components/modules included in the transmitter 125 and the receiver 130 may similarly function in other devices that generate and process digital data (e.g., without transmission/reception of the digital data). For example, one or more of the components shown in the transmitter 125 may operate similarly in a digital signal generation device that generates and stores digital data in memory. One or more components shown in the receiver 130 may operate similarly in a digital signal processing device that retrieves digital data stored in memory, performs sampling rate conversion of the digital data, and/or generates analog data based on resampled digital data.

Further, while the example digital system 100 illustrates the conversion between digital signals and analog signals, in other examples, the digital system 100 may operate purely on digital data without using any conversion. For example, a data source 102 may be a digital audio source and/or a data sink 120 may be a digital audio sink. In this scenario, the data converters 104 and 118 need not be used.

The transmitter 125 may comprise at least a data source 102, a data converter 104, a codec encoder 106, and/or a network buffer 108. In an example, the data source 102 may be a standalone device separate from the rest of the components of the transmitter 125. The data converter 104 may comprise an analog to digital converter (ADC) that performs various operations (e.g., sampling, quantization, etc.) to generate samples (e.g., digital data) corresponding to the analog input. The data converter 104 may convert the analog input into data samples at a corresponding first sampling rate. The codec encoder 106 may encode the generated data samples into a digital stream of data packets for transmission. For example, each data packet may comprise one or more encoded data samples. The network buffer 108 may comprise memory (e.g., a first-in first-out (FIFO) register) in which the data packets may be stored prior to transmission via a communication channel 110. The communication channel 110 may comprise a wired communication channel, and/or a wireless communication channel, via which the data packets may be transmitted to the receiver 130. In an example, the data source 102 may comprise a microphone and/or any other device (e.g., an analog memory storage device, such as a magnetic tape cassette or a long playing (LP) record) providing analog input, and the data packets may comprise audio data.

The receiver 130 may comprise a network buffer 112, a codec decoder 114, an asynchronous sampling rate converter 116, a data converter 118, and/or a data sink 120. The network buffer 112 may comprise memory that may be used to store incoming data packets prior to processing by the rest of the components of the receiver 130. The codec decoder 114 may process/decode the received data packets to retrieve data sample(s) stored within the data packets. The asynchronous sampling rate converter (ASRC) 116 may be used to generate, from the received data samples, another set of data samples at a second sampling rate. The second sampling rate may be the same as, or different (e.g., higher, or lower) from, the first sampling rate. The second sampling rate may be a sampling rate that may be processed by the data converter 118. The data converter 118 may comprise a digital to analog converter (DAC) that converts the data samples (at the second sampling rate) into an analog output. The analog output may be provided to the data sink 120. In an example, the data sink may be an audio playback device (e.g., speaker, headphones, etc.) and/or may be any other device (e.g., an analog memory storage device, such as a magnetic tape cassette or an LP record). Additionally, or alternatively, the data samples (at the second sampling rate) may be sent to another digital device/network (e.g., without conversion to an analog signal).

Figure 2:
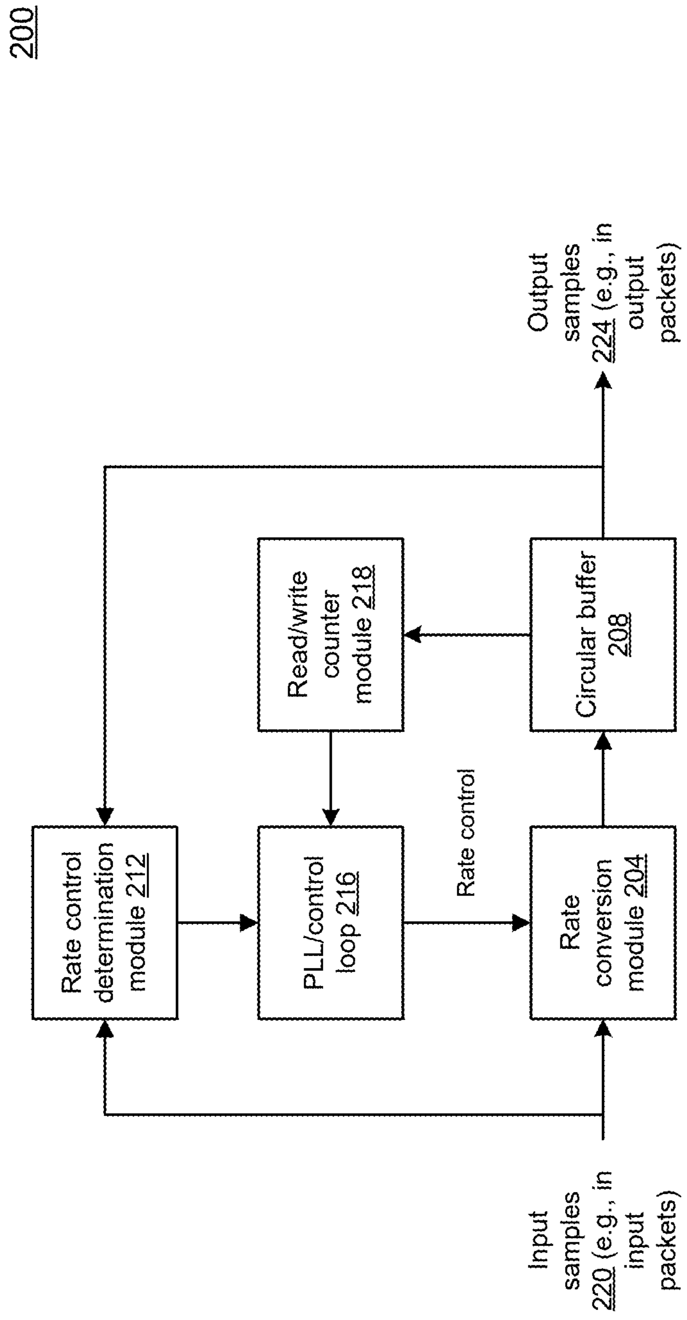
FIG. 2 shows an example block diagram of an asynchronous sampling rate converter (ASRC)

FIG. 2 shows an example block diagram 200 of an ASRC (e.g., the ASRC 116). The ASRC may comprise a rate conversion module 204, a circular buffer 208, a rate control determination module 212, a phase-locked loop (PLL) or other control loop 216, and/or a read/write counter module 218. Input packets, generated at a packet write rate of $S_{in}$ may be received from the codec decoder 114. The rate conversion module 204 may be used to generate, from the input packets at the packet write rate $S_{in}$, output packets. The input packets and the output packets may comprise data samples. Each of the input packets may comprise samples that are generated at an input sampling rate.

The generated output packets may be stored in the circular buffer 208. Packets may be stored in and read-out from the circular buffer 208 at different rates. For example, a packet read rate $S_{out}$ may be fixed, while the rate at which generated packets are stored in the circular buffer 208 may vary (e.g., based on parameters of the rate conversion module 204). As further described herein, parameters of the rate conversion module 204 may be modified such that the rate of generation/storage of packets (e.g., by the rate conversion module 204) matches the packet read rate $S_{out}$. A packet read rate $S_{out}$ may be based on a rate at which the data converter 118 operates and may be equal to a rate at which packets are read-out of the circular buffer 208 (e.g., output buffer) by the data converter 118. The data converter 118 may retrieve the output packets from the circular buffer 208 and generate output data (e.g., as described with reference to FIG. 1). Each of the output packets may comprise samples that are generated at an output sampling rate.

Each of the input packets may comprise one or more input samples 220. Each of the output packets may comprise one or more output samples 224. Each of the input packets and the output packets may comprise a same quantity of samples.

A ratio of a quantity of output samples 224, generated by the rate conversion module 204, to a corresponding quantity of input samples 220 (used to generate the output samples 224) may be based on a rate control value determined by the rate control determination module 212. The rate control determination module 212, by determining the appropriate rate control value, may ensure that the circular buffer 208 does not overflow or underflow, and a fill level of the circular buffer 208 remains stably bounded. Overflow may occur due to packets being stored in the circular buffer 208 at a faster rate than the output sampling rate. Underflow may occur due to samples being stored in the circular buffer 208 at a slower rate than the output sampling rate.

The rate control value may be determined based on time stamps as recorded in received packets at the receiver 130 or generated by the receiver at packet reception. For example, a precision time protocol (PTP) may be implemented in the transmitter 125 and the receiver 130. The transmitter 125 and the receiver 130 may comprise corresponding local clocks. Each packet, as sent by the transmitter 125, may include a time stamp recording a local clock value at a local clock of the transmitter 125. Additionally, or alternatively, each packet as received by the receiver may be associated with/assigned a corresponding time stamp which indicates a local clock value at a local clock of the receiver 130 at the time of reception of the packet. The ASRC may record a value of the local clock at the receiver 130 every time a packet is read from the circular buffer 208.

The ASRC may determine a time difference (e.g., an average time difference) between subsequent input packets as received at the ASRC from the codec decoder 114. For example, a time difference $\Delta T_{in}$ between consecutive received packets may be determined as:

$$\Delta T_{in} = T_{Tx}^{n} - T_{Tx}^{n-1} \qquad \text{Equation (1)}$$

where $T_{TX}^{n-1}$ may be a time stamp on/associated with received packet n−1 and $T_{TX}^{n}$ time stamp on/associated with a current received packet n, and $T_{TX}^{n}$-$T_{TX}^{n-n}$ may be the total time duration between arrival of packets n−1 and n.

The ASRC may determine a time difference (e.g., an average time difference) between clock values at time instances when output packets are read from the circular buffer 208 (e.g., by the data converter 118). For example, as each output packet in the circular buffer 208 is read out, a time difference $\Delta T_{out}$ between consecutive output packets may be determined as:

$$\Delta T_{out} = T_{Rx}^{p} - T_{Rx}^{p-1} \qquad \text{Equation (2)}$$

where $T_{Rx}^{p-1}$ may be a value of a local clock at the time instance when packet p−1 is read from the circular buffer 208, $T_{Rx}^{p}$ may be a value of a local clock at the time instance when a current packet p is read from the circular buffer 208, and $T_{Rx}^{p}$-$T_{Rx}^{p-1}$ may be the time duration between the time instances when the packets are read out.

The series of values of $\Delta T_{in}$ and $\Delta T_{out}$, as obtained for a sequence of packets, may be processed using a set of filters. For example, the series of values of $\Delta T_{in}$ and $\Delta T_{out}$ may be processed using a first moving average filter, followed by a median filter, followed by a second moving average filter. For example, the moving average filters may comprise at least 256 taps (e.g., with all coefficients set to 1). The median filter may comprise at least 11 taps. Based on processing of the series of values of $\Delta T_{in}$ and $\Delta T_{out}$, filtered values $\Delta T_{in,fil}$ and $\Delta T_{out,fil}$ may be obtained. $\Delta T_{in,fil}$ and $\Delta T_{out,\ fil}$ may provide an estimate of packet write rate $S_{in}$ and packet read rate $S_{out}$. For example, $S_{in}$ may be equal to $1/\Delta T_{in,fil}$ and $S_{out}$ may be equal to $1/\Delta T_{out,fil}$. The initial rate control value $R_{c,i}$ may be determined as:

$$R_{c,i} = \frac{\Delta T_{out,fil}}{\Delta T_{in,fil}} = \frac{S_{in}}{S_{out}} \qquad \text{Equation (3)}$$

Temperature variations, noise, or any other variations may cause sampling rate variations at the transmitter 125 and the receiver 130. As such, even if an initial rate control value $R_{c,i}$ is applied to the rate conversion module 204, there is a chance that a fill level of the circular buffer 208 is subject to significant variations and may even lead to buffer overflow or underflow.

A PLL or control loop 216 may be used to maintain a rate control value $R_c$ at an appropriate level to negate the effects of temperature variations and noise on the sampling rates. The PLL or control loop may be based on a value $\Delta c$ that is equal to a difference between a total quantity of read operations (e.g., total quantity of samples read) from the circular buffer 208 and a total quantity of write operations on (e.g., total quantity of samples written in) the circular buffer 208. For example, $$\Delta c = \text{total samples read} - \text{total samples written} \qquad \text{Equation (4)}$$

$\Delta c$ may be determined by the read/write counter module 218. Upper and lower bounds of $\Delta c$ may be defined such that corrections may be applied to the initial rate control value $R_{c,i}$ based on $\Delta c$ exceeding the upper bound or falling below the lower bound. An instantaneous error signal may be generated based on $\Delta c$ exceeding the upper bound or falling below the lower bound.

If $\Delta c$ falls below the lower bound, it may indicate/imply that samples are being written into the circular buffer faster than samples are being read from the circular buffer. To adjust the initial rate control value $R_{c,i}$ when samples are being written into the circular buffer faster than samples are being read from the circular buffer, a positive correction ($C_{pos}$) may be applied to $R_{c,i}$. The positive correction may be based on a weighted instantaneous error signal.

If $\Delta c$ exceeds the upper bound, it may indicate/imply that samples are being read from the circular buffer faster than samples are being written into the circular buffer. To adjust the initial rate control value $R_{c,i}$ when samples are being read from the circular buffer faster than samples are being written into the circular buffer, a negative correction ($C_{neg}$) may be applied to $R_{c,i}$. The negative correction may be based on a weighted instantaneous error signal.

The PLL or control loop may be a proportional-integral (PI) controller. An integrator may operate on a series of weighted instantaneous error signals to generate an integrated correction signal ($C_{int}$). The integrated correction signal may be applied to the initial rate control value $R_{c,i}$. A rate control $R_c$, to be applied to the rate conversion module 204, may be defined as:

$$R_c = R_{c,i} + C_{int} + C_{pos} - C_{neg} \quad \text{Equation (5)}$$

In another example, any other error zeroing control loop/algorithm may be used to maintain the rate control value $R_c$. For example, an error signal may be generated based on $\Delta c$ exceeding the upper bound or falling below the lower bound. An error correction may be applied to the initial rate control value $R_{c,i}$ to generate the rate control value $R_c$. The error correction may be based on a sign and a magnitude of the error signal. The correction may be continually applied until a sign of the error signal changes. An error correction of opposite sign and reduced magnitude may then be applied based on the change in the sign of the error signal. This process may then be repeated until the error signal is minimized and/or becomes zero.

An $R_c$ value less than one may indicate/imply that samples (e.g., output samples 224 as included in the output packets) are being read out from the circular buffer 208 at a rate that is faster than a rate at which samples (e.g., input samples 220 as included in the input packets) are being received at the ASRC (e.g., $S_{out}>S_{in}$). Accordingly, the rate conversion module 204 may generate a greater number of output samples 224 than are input at the ASRC 116 from the codec decoder 114. An $R_c$ value greater than one may indicate/imply that samples are being read out from the circular buffer 208 at a rate that is slower than a rate at which samples are being received at the ASRC (e.g., $S_{out}<S_{in}$). Accordingly, the rate conversion module 204 may generate a fewer number of output samples 224 than are input at the ASRC 116 from the codec decoder 114. An $R_c$ value equal to one may indicate/imply that samples are being read out from the circular buffer 208 at a rate that is equal to a rate at which samples are being received at the ASRC (e.g., $S_{out}=S_{in}$). In this scenario, the rate conversion module 204 may just pass the received samples to the data converter 118 with a slight phase offset and without changing the input sampling rate. Application of $R_c$ to the rate conversion module 204 may result in generation of output samples 224 at a rate that matches/tracks the output sampling rate. Additional details regarding the operation of the rate conversion module 204 are described with respect to FIG. 3.

Figure 3:
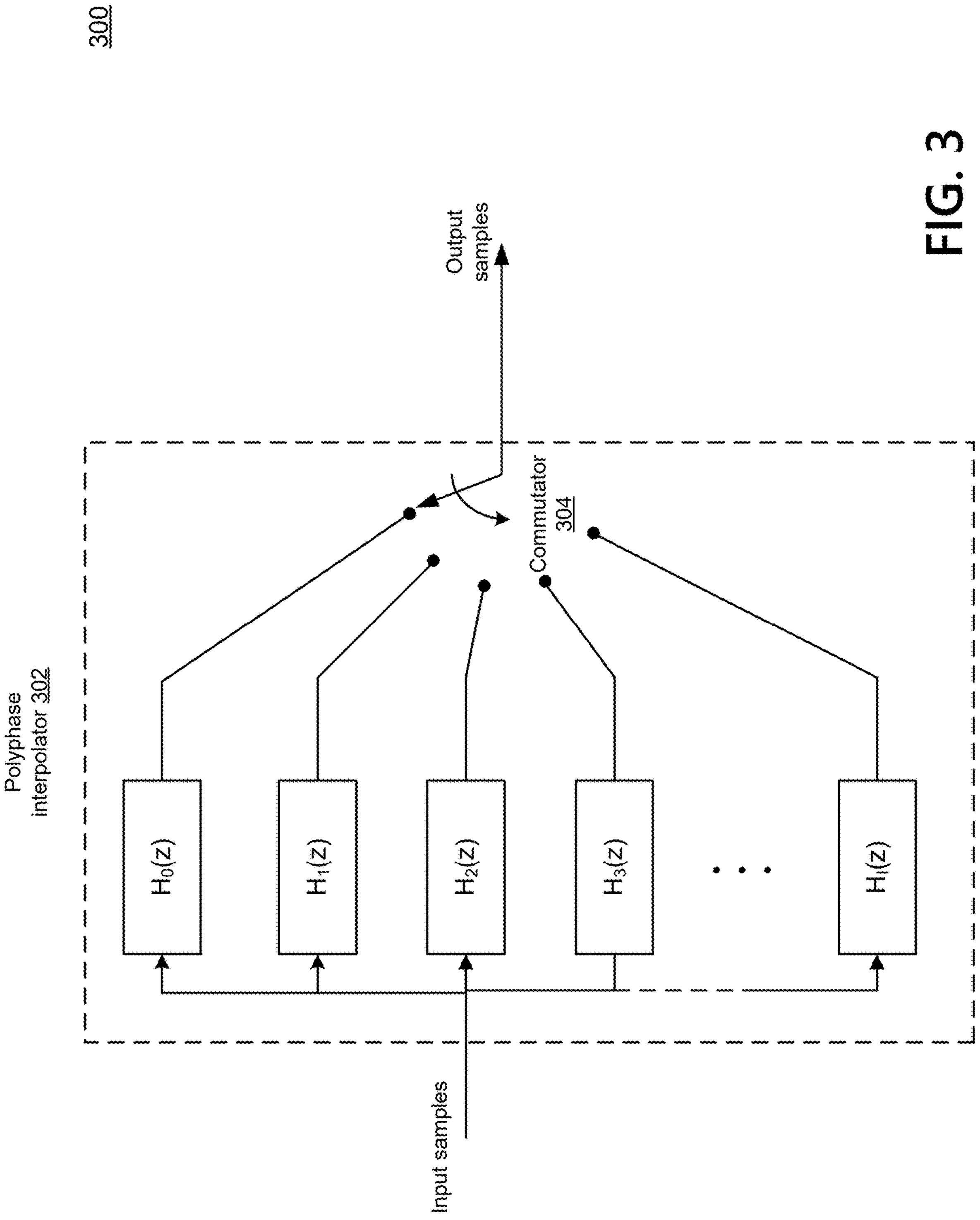
FIG. 3 shows an example rate conversion module.

FIG. 3 shows an example operation 300 of a rate conversion module. The operation 300 of the rate conversion module of FIG. 3 may correspond to an operation of the rate conversion module 204. The rate conversion module may be represented as a polyphase interpolator 302 comprising a commutator 304. The number of subfilters $H_0(z)$, $H_1(z)$, . . . $H_1(z)$ (e.g., number of phases) in the polyphase interpolator 302 may be equal to the interpolation factor I. The interpolation factor/may be any value (e.g., 16, 32, 64, etc.). The coefficients of the subfilters of the polyphase interpolator 302 may be determined based on the interpolation factor I and a bandwidth of the polyphase interpolator 302. The polyphase interpolator 302 may be an interpolation filter (e.g., a low pass filter). For example, for an input signal that is band limited to 6.5 kHz, the polyphase interpolator may be a low pass filter with an 80 dB rejection at 48 KHz.

The rate conversion module 300 need not compute output from each subfilter for every single input sample. The rate conversion module 300 need only compute outputs from the subfilters that will be finally output from the rate conversion module 300. A subfilter index $i_m$ for generation of $m^{th}$ output sample may be determined as:

$$i_m = (Rc(m)I) \bmod I \quad \text{Equation (7)}$$

where Rc(m) is the rate control value for the $m^{th}$ output sample, and mod is the modulo operation. In an example, the required coefficients may be cyclically applied to the input to compute a corresponding output. Computing of only a subset of subfilter outputs may reduce a computational load at the receiver 130.

In some examples, the subfilter index $i_m$ may not be resolvable as an integer as per Equation (7). If the subfilter index is not resolvable as an integer, none of the/subfilters of the polyphase interpolator 302 may provide exact coefficient values to be used for determining output samples. In this scenario, coefficients of a subfilter to be utilized in the polyphase interpolator 302 may be determined (e.g., interpolated) from a coefficient set of a nearest subfilter. A Taylor's series expansion may be used to determine a coefficient set f(i+Δi) for a subfilter index (i+Δi) from a coefficient set f(i) of the nearest subfilter with index i<(i+Δi) of the/subfilters. For example, as per Taylor's series, $$f(i+\Delta i) = f(i) + \frac{\Delta i}{1!}f'(i) + \frac{\Delta i^2}{2!}f''(i) + \frac{\Delta i^3}{3!}f'''(i) + \frac{\Delta i^4}{4!}f''''(i) + O(\Delta i^5) \quad \text{Equation (8)}$$

To reduce computational load only the first few terms (e.g., first two or three terms) of the Taylor's series expansion need be considered for determining f(i+Δi). The derivative f'(i) may be calculated as a convolution of the prototype lowpass filter, prior to being transformed to a polyphase filter with the sequence h(k)= [0.5 0-0.5]. h(k) may approximate a derivative function and may correspond to a finite impulse response (FIR) filter.

A non-integer value of subfilter index may be represented as $(i+\Delta i)_m$, where i may be the integer portion of $(i+\Delta i)_m$ and may represent an index of the nearest subfilter (e.g., subfilter with index i<(i+Δi)). Δi may be the fractional portion of $(i+\Delta i)_m$ and may be applied in the Taylor's series for determination of coefficients of subfilter $(i+\Delta i)_m$ based on the coefficients of the nearest subfilter with index i<(i+Δi). A new input sample may be input to the subfilters of the polyphase interpolator 302 each time ($R_c$(m)I) exceeds I.

Figure 4:
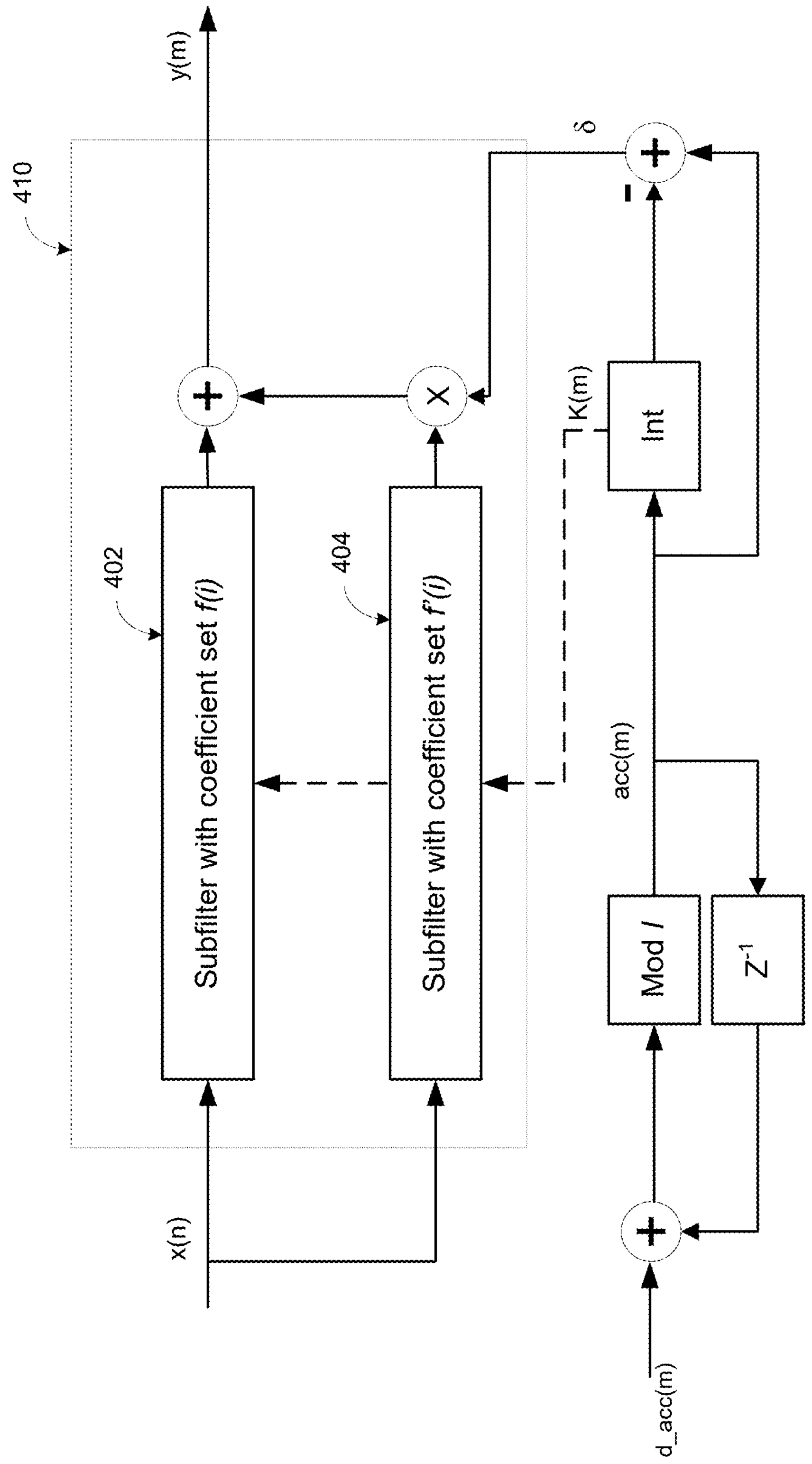
FIG. 4 shows an example determination of output samples.

FIG. 4 shows an example determination of output samples. Input samples x(n) may be processed by the subfilters 402 and 404 to generate the output samples y(m). The coefficient set f'(i) for the subfilter 404 may correspond to a derivative of the coefficient set f(i) for the subfilter 402. d_acc(m) may be determined as:

$$\text{d\_acc}(m) = R_c(m)I \qquad \text{Equation (9)}$$

acc(m) may be determined based on a summation of d_acc (m) and acc(m−1). For example, acc(m) may be determined as:

$$acc(m) = (\text{d\_acc}(m) + acc(m-1))\bmod I \qquad \text{Equation (10)}$$

A new sample x may be input into the subfilter memory for processing (e.g., using the subfilters 402 and 404) based on/in response to d_acc(m)+acc(m−1) exceeding I.

The integer value of acc(m) (represented as K(m) in FIG. 4) may correspond to a subfilter i (e.g., with subfilter coefficients f(i)). The fractional part δ (e.g., acc(m)−K(m)) may correspond to/be equal to Δi and may be used to determine the coefficient set f(i+Δi) in accordance with Equation (8). Block 410, with subfilters 402 and 404, may represent the filter applied to input samples x(n) to determine output samples y(m). In FIG. 4, only the first two terms of the Taylor's series expansion (e.g., corresponding to subfilters 402 and 404) are used to determine the output samples y(n), but in other examples other quantities of terms may be used.

Figure 5:
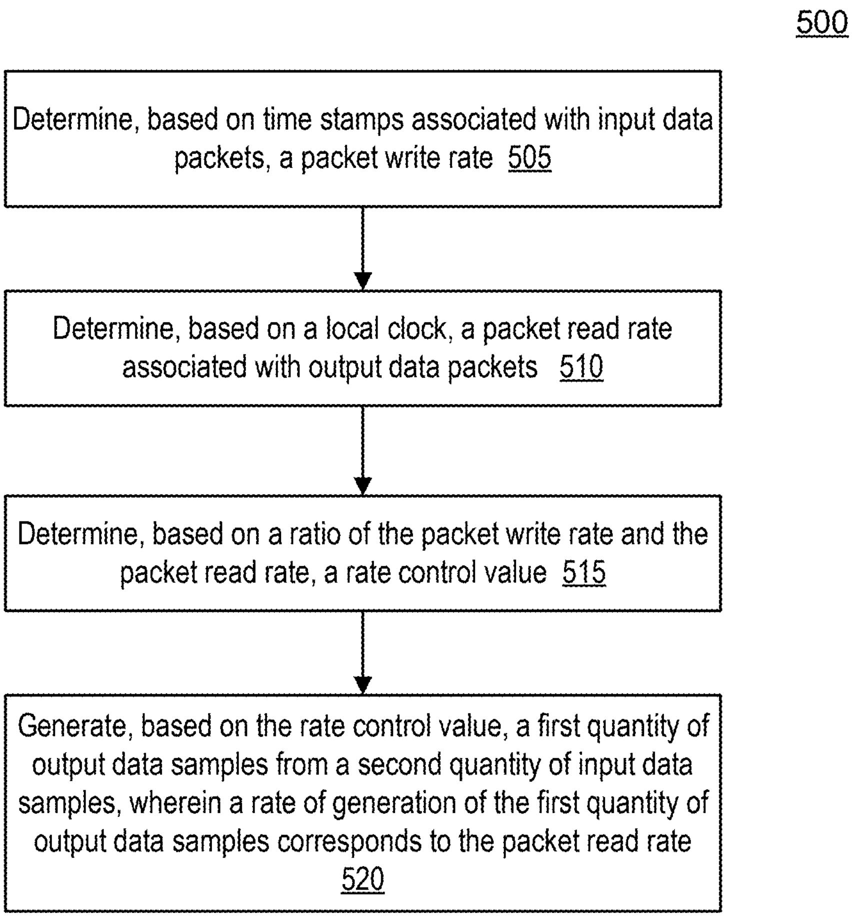
FIG. 5 shows an example method for sampling rate conversion.

FIG. 5 shows an example method 500 for sampling rate conversion. The sampling rate conversion may be performed at an ASRC (e.g., the ASRC 116). At step 505, the ASRC may determine, based on time stamps associated with input data packets (e.g., received data packets), a packet write rate ($S_{in}$ or $1/\Delta T_{in,fil}$) associated with the input data packets. Each of the input data packets may comprise one or more input data samples. The time stamps may be generated by a transmitted device at the time of packet transmission or may be generated locally by a receiver device at the time of packet reception. The data packets may be packets received in a signal stream from a transmitting device. For example, the packet write rate associated with the input data packets may be determined based on Equation (1).

At step 510, the ASRC may determine, based on a local clock, a packet read rate ($S_{out}$ or $1/\Delta T_{out,fil}$) associated with output data packets as generated by the ASRC. The local clock may correspond to a clock located at/associated with a receiver device or any other device which uses the ASRC. The packet read rate may correspond to a rate at which the output data packets are read from an output buffer (e.g., the circular buffer 208). For example, the packet read rate may be determined based on Equation (2). Each of the output data packets may comprise one or more output data samples.

At step 515, the ASRC may determine, based on a ratio of the packet write rate and the packet read rate, a rate control value. For example, the rate control value may be an initial rate control value $R_{c,i}$ as determined using Equation (3). A PLL (or a control loop) applying a PI control algorithm (or any error zeroing control loop) may be used to determine an adjusted rate control value $R_c$ to accommodate noise and temperature variations in sampling rates and/or sample read-out rate (e.g., which may affect packet write rate and packet read rate).

At step 520, the ASRC (e.g., the rate conversion module 204, polyphase interpolator 302) may generate, based on the rate control value, a first quantity of output data samples using a second quantity of input data samples. For example, if the rate control value is greater than one, the first quantity of output data samples may be less than the second quantity of input data samples. If the rate control value is less than one, the first quantity of output data samples may be greater than the second quantity of input data samples. If the rate control value is equal to one, the first quantity of output data samples may be equal to the second quantity of input data samples. A rate of generation of the first quantity of output data samples may correspond to a packet read rate of the output buffer (e.g., the circular buffer 208). For example, the rate of generation of the first quantity of output data samples may match (e.g., may be equal to, substantially equal to, or correspond to) a rate at which output data samples, as stored in output data packets in the output buffer (e.g., the circular buffer 208), are read out. The second quantity of input data samples may follow (e.g., may be received after) the data packets (e.g., as received at step 505).

Figure 6:
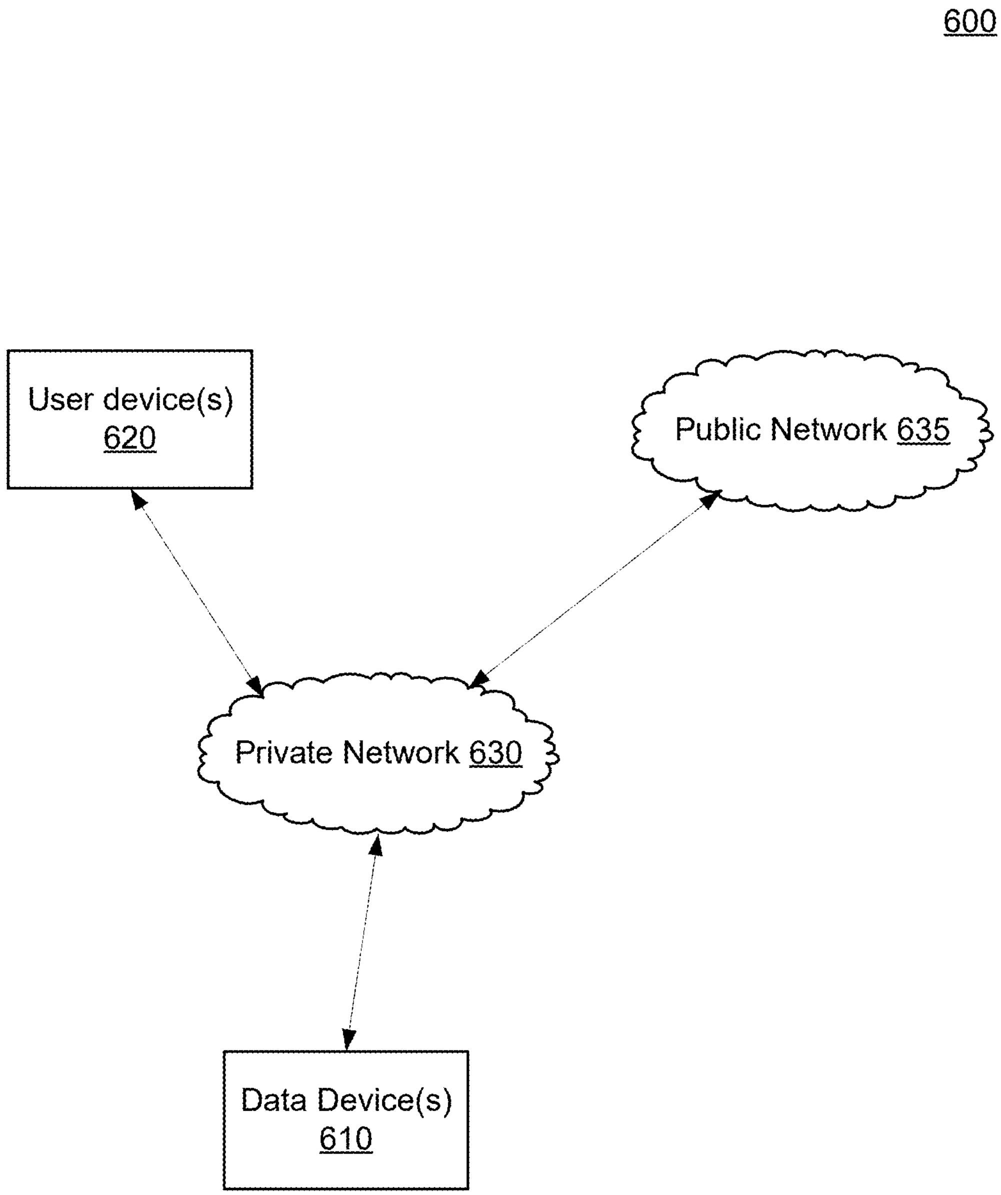
FIG. 6 shows an example communication network.

FIG. 6 shows an example communication network 600. The communication system 600 may comprise one or more data devices 610, one or more user devices 620, and/or one or more other devices connected via a private network 630. The private network 630 may facilitate communication of data and/or control information between the various devices connected to the private network 630. For example, the private network 630 may be used for transmission of digital signals from a transmitting device to a receiving device.

One or more devices in the private network 630 may also be configured for communication via a public network 635 (e.g., the Internet). Connection to the public network 635 may enable one or more devices (e.g., data device(s) 610, user device(s) 620), associated with the private network 630, to live-stream audio data to remote listeners, receive device configuration information from a server (e.g., software and/ or firmware updates), receive data (e.g., broadcast from a remote location, from a server, etc.) for further processing or storage, etc. Communication via the private network 630 and/or the public network 635 may comprise transmission and/or reception of electrical and/or electromagnetic signals that may comprise data (e.g., audio data, or any other type of data) and/or control information.

The devices in the communication system 600 may transmit/exchange/share information via hardware and/or software interfaces using one or more communication protocols (e.g., proprietary and/or non-proprietary communication protocols). The communication protocols may define/codify operation of one or more layers in an Open Systems Interconnection (OSI) model that enable interconnection between and interoperability of multiple devices, applications, and/or systems forming the communication system 600. For example, devices in or connected via the private network 630 and/or the public network 635 may use one or more of Bluetooth protocol(s), Zigbee protocol(s), Institution of Electrical and Electronics Engineers (IEEE) 802.11 Wi-Fi protocol(s), 3rd Generation Partnership Project (3GPP) cellular protocol(s), local area network (LAN) protocol(s), wide area network (WAN), hypertext transfer protocols (HTTP), and/or any other wireless communication protocol, to send and receive audio and/or control information. At least some devices in the private network 630 may (e.g., additionally) use wired communication protocols (e.g., universal serial bus (USB) protocol(s), Ethernet protocol(s), and/or any other wired communication protocol) for communication with other devices.

In an example, the communication between the devices in the communication system 600 may be via wireless channels that are designated as industrial, scientific, and medical (ISM) bands defined by the International Telecommunication Union (ITU) Radio Regulations (e.g., a 2.4 GHz-2.5 GHz band, a 5.75 GHz-5.875 GHz band, a 24 GHz-24.25 GHz band, and/or a 61 GHZ-61.5 GHz band, etc.). Additionally, or alternatively, the communication between the devices in the communication system 600 may be via (e.g., one or more channels within) a very high frequency (VHF) band (e.g., 30 MHz-300 MHz band), via (e.g., one or more channels within) an ultra-high frequency (UHF) band (e.g., 300 MHz-3 GHZ), and/or via any other frequency/frequency band. More specifically, the communication between the devices in the communication system 600 may be via a digital enhanced cordless telecommunications (DECT) band, unlicensed part 15 bands, part 74 bands, and/or any other bands.

Data device(s) 610 may comprise one or more audio input device(s), audio output device(s), and/or audio processing device(s). Data device(s) 610 may comprise one or more of: microphone(s), microphone car piece(s), transceiver(s) (e.g., associated with a musical instrument), speaker(s), wireless headset(s), audio receiver device(s) (e.g., with an output interface such as an XLR connector, USB connector, 3.5 mm connector, etc.), audio mixer(s), and/or any other type of device capable of generating and/or processing audio or digital data packets. The private network 630 may also comprise one or more wireless hubs. A wireless hub may interface and/or consolidate communications between the devices in the private network 630. For example, a wireless hub may receive audio packets from audio input device(s) (e.g., microphone(s)). The wireless hub may send (e.g., unicast, broadcast) audio packets to audio output device(s) (e.g., speaker(s), carpieces associated with microphones) and/or audio processing device(s) (e.g., a sound mixer).

The communication network 600 may comprise one or more devices transmitting, receiving, and/or processing audio signals. The communication network 600 may comprise one or more devices associated with signals other than audio signals. For example, the one or more devices may generate/process any other type of analog/digital data/signals in a manner that is similar, or substantially similar, to as described herein (e.g., with respect to FIGS. 1-5). For example, the signals may comprise computer-generated signals (e.g., telemetry data) within any portion of the audio band (or within any other frequency band).

The user device(s) 620 may comprise one or more personal computing device(s) (e.g., desktop computers, laptop computers), mobile computing device(s) (e.g., smartphone (s), tablet(s)), and/or any other device that may provide a user interface (e.g., graphical user interface (GUI)) for controlling and monitoring the operation of the communication network. The user device(s) 620 may comprise a server-based monitor and/or control application and/or a cloud-based monitor and/or control application providing a user interface. For example, a user device 620 may be used to provide various settings and/or parameters associated with the operation of the data device(s) 610, and/or any other device in the private network 630. For example, a user interface, associated with the user device 620, may be used to select data device(s) 610 with which a wireless hub may establish communication, or may be used to configure a connection between two data devices (e.g., an audio input device and an audio output device). In at least some examples, the user device(s) 620 may provide digital input to, and/or receive digital signals from, one or more devices in the private network 630. Data device(s) 610, user device (s) 620, and/or wireless hub(s) may correspond to transmitters and/or receivers as described with reference to FIG. 1. For example, the data device(s) 610, user device(s) 620, and/or wireless hub(s) may utilize sampling rate conversion techniques as described herein to process received digital data.

Figure 7:
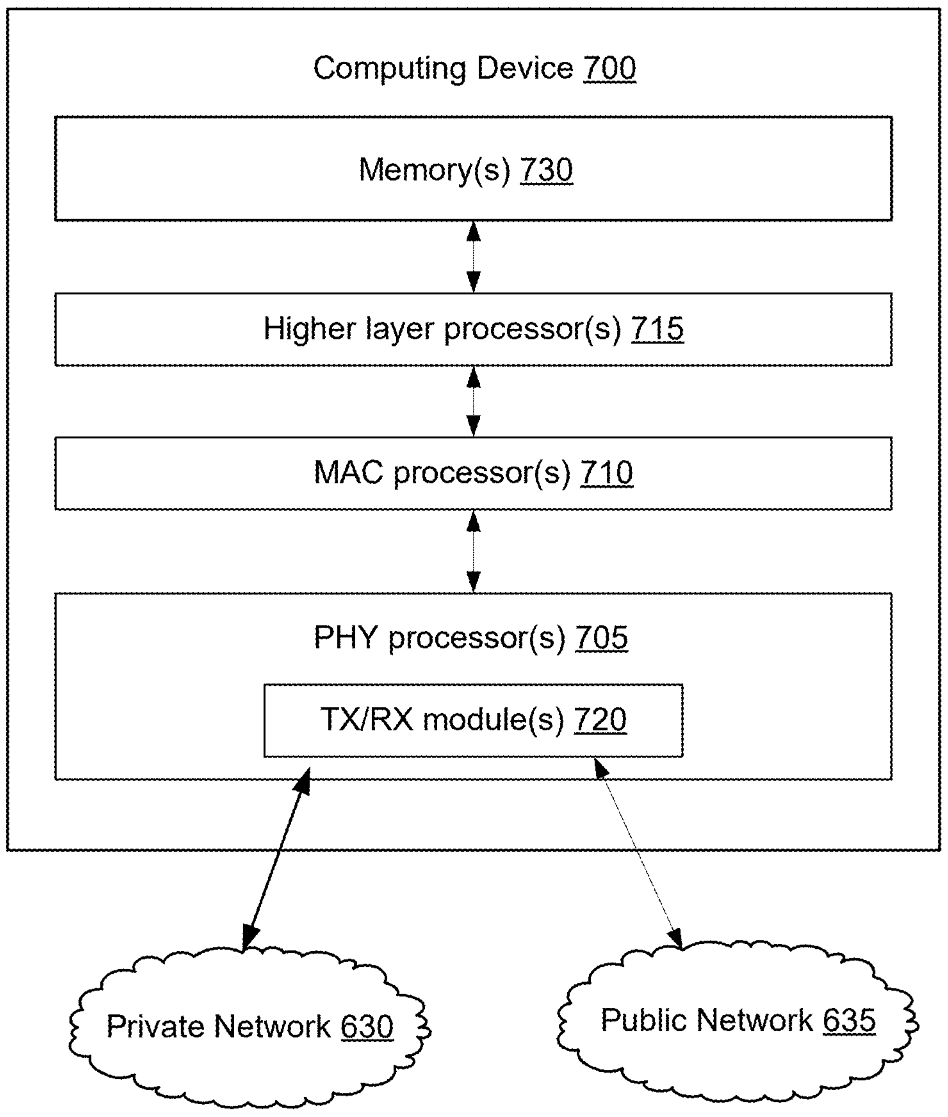
FIG. 7 shows an example architecture of a computing device in a communication network.

FIG. 7 shows an example architecture of a computing device 700 in the communication network 600. The computing device 700 may correspond to an audio input device, an audio output device, a wireless hub, an audio or digital data processing device, and/or the like. The computing device 700 may comprise one or more of physical layer (PHY) processor(s) 705, medium access control (MAC) processor(s) 710, higher layer processor(s) 715, transmit/receive (TX/RX) module(s) 720, and/or memory 730. The audio device 700 may communicate, via one or more communication protocols, with one or more other devices (e.g., via the private network 630 and/or the public network 635). One or more data buses, wires, and/or conducting paths such as printed circuit board traces may interconnect the PHY processor(s) 705, the MAC processor(s) 710, the higher layer processor(s) 715, the TX/RX module(s) 720, and/or the memory 730.

The computing device 700 may be implemented using one or more integrated circuits (ICs), software, or a combination thereof, configured to operate as discussed below. The various processors (e.g., one or more of the PHY processor(s) 705, the MAC processor(s) 710, the higher layer processor(s) 715) may be implemented, at least partially, on a single IC or multiple ICs.

Messages transmitted from and/or received by the computing device 700 may be encoded in one or more MAC data units and/or PHY data units. The MAC processor(s) 710 and/or the PHY processor(s) 705 of the computing device 700 may be configured to generate data units, and process received data units, that conform to any suitable wired and/or wireless communication protocol. For example, the MAC processor(s) 710 may be configured to implement MAC layer functions, and the PHY processor(s) 705 may be configured to implement PHY layer functions corresponding to a communication protocol. The MAC processor(s) 710 may, for example, generate MAC data units (e.g., MAC protocol data units (MPDUs)) based on operations performed by the higher layer processor(s) 715, and forward the MAC data units to the PHY processor(s) 705. The PHY processor(s) 705 may, for example, generate PHY data units (e.g., PHY protocol data units (PPDUs)) based on the MAC data units. The generated PHY data units may be transmitted via the TX/RX module(s) 720 to one or more other devices in the private network 630 and/or the public network 635. Similarly, the PHY processor(s) 705 may receive PHY data units (e.g., as sent by one or more other devices in the private network 630 and/or the public network 635) via the TX/RX module(s) 720, extract MAC data units encapsulated within the PHY data units and forward the extracted MAC data units to the MAC processor(s) 710. The MAC processor(s) 710 may then process the MAC data units (e.g., as forwarded by the PHY processor(s) 705) and forward the processed MAC data units to the higher layer processor(s)

715 for additional processing. In an example, the PHY data units and/or the MAC data units may correspond to audio packets transmitted via the private network 630.

The higher layer processor(s) 715 may implement one or more other layers of the OSI model (e.g., network layer, transport layer, session layer, presentation layer, and/or application layer) representing the operations of the computing device 700. The higher layer processor(s) 715 may process data units for transmission via the MAC processor (s) 710 and the PHY processor(s) 705, and/or process data units as received via the PHY processor(s) 705 and the MAC processor(s) 710.

The memory 730 may comprise any memory such as a random-access memory (RAM), a read-only memory (ROM), a flash memory, or any other electronically readable memory, or the like. The processors (e.g., one or more of the PHY processor(s) 705, the MAC processor(s) 710, the higher layer processor(s) 715), the TX/RX module(s) 720, and/or other component/modules of the computing device 700 may be configured to execute machine readable instructions stored in the memory 730 to perform the various operations described herein. The TX/RX module(s) 720 may comprise components (mixers, amplifiers, drivers, antennas, etc.) for wireless transmission and/or reception of signals (e.g., audio packets, control information) via the private network 630 and/or for communication (e.g., wired and/or wireless communication) via the public network 635.

A method may comprise one or more operations. The method may comprise determining, by a computing device and based on packet time stamps associated with input data packets of a signal, a packet write rate. The method may comprise determining, based on a local clock of the computing device, a packet read rate associated with output data packets. The method may comprise determining, based on a ratio of the packet write rate and the packet read rate, a rate control value. The method may comprise generating, based on the rate control value, a first quantity of output samples in one or more output data packets based on a second quantity of input samples in one or more input data packets, wherein a rate of generation of the first quantity of output samples corresponds to the packet read rate. Determining the packet write rate may comprise determining an average value of filtered differences between packet time stamps associated with consecutive input data packets of the signal. Determining the packet read rate may comprise determining an average value of filtered time differences between clock values, of the local clock, at time instances when subsequent packets are read from a buffer. Each input data packet may comprise one or more input samples, and each output data packet comprises one or more output samples. Generating the first quantity of output samples may comprise generating the first quantity of output samples using a polyphase interpolator. Coefficients of subfilters of the polyphase interpolator may be based on an interpolation factor of the polyphase interpolator. A number of phases of the polyphase interpolator may be equal to an interpolation factor of the polyphase interpolator. The packet read rate associated with the output data packets may correspond to a read-out rate from a buffer storing the output data packets. Generating an output sample may comprise one or more of: determining a subfilter index of a subfilter based on the rate control value and an interpolation factor; selecting a nearest previous subfilter, of the polyphase interpolator, based on an integer part of the subfilter index; determining, based on a coefficient set of the nearest previous subfilter and a fractional part of the subfilter index, a coefficient set of the subfilter; and/or generating the output sample using the coefficient set of the subfilter. Determining the coefficient set for the subfilter may comprise using a Taylor's series expansion based on the coefficient set of the nearest previous subfilter and the fractional part of the subfilter index. The method may comprise using a phase-locked loop (PLL) or other control loop to maintain a fill level of a buffer storing the output samples within a predetermined range. The method may comprise receiving, from a transmitting device, the packets of the signal. The computing device may be an audio device or a digital computing device. The signal may comprise an audio signal or a band limited signal. The packet time stamps may be generated based on the local clock of the computing device. A computing device may comprise one or more processors and memory storing instructions that, when executed by the one or more processors, cause the computing device to perform the above-described method. A system may comprise: a receiving device configured to perform the above-described method, and a transmitting device configured to send packets of the signal. A system may comprise: a computing device configured to perform the above-described method, and a memory storage device configured to store packets of the signal. A computer-readable medium may be provided storing instructions that, when executed, cause performance of the above-described method.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally, or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

The invention claimed is:

1. A method comprising:

determining, by a computing device and based on packet time stamps associated with input data packets of a signal, a packet write rate;

determining, based on a local clock of the computing device, a packet read rate associated with output data packets;

determining, based on a ratio of the packet write rate and the packet read rate, a rate control value; and generating, based on the rate control value, a first quantity of output samples in one or more output data packets based on a second quantity of input samples in one or more input data packets, wherein a rate of generation of the first quantity of output samples corresponds to the packet read rate.

2. The method of claim 1, wherein the determining the packet write rate comprises determining an average value of filtered differences between packet time stamps associated with consecutive input data packets of the signal.

3. The method of claim 1, wherein the determining the packet read rate comprises determining an average value of filtered time differences between clock values, of the local clock, at time instances when subsequent packets are read from a buffer.

4. The method of claim 3, wherein: each input data packet comprises one or more input samples, and each output data packet comprises one or more output samples.

5. The method of claim 1, wherein the generating the first quantity of output samples comprises generating the first quantity of output samples using a polyphase interpolator.

6. The method of claim 5, wherein coefficients of subfilters of the polyphase interpolator are based on an interpolation factor of the polyphase interpolator.

7. The method of claim 5, wherein a number of phases of the polyphase interpolator is equal to an interpolation factor of the polyphase interpolator.

8. The method of claim 5, wherein generating an output sample, of the first quantity of output samples, comprises:

determining a subfilter index of a subfilter based on the rate control value and an interpolation factor;

selecting a nearest previous subfilter, of the polyphase interpolator, based on an integer part of the subfilter index;

determining, based on a coefficient set of the nearest previous subfilter and a fractional part of the subfilter index, a coefficient set of the subfilter; and generating the output sample using the coefficient set of the subfilter.

9. The method of claim 8, wherein the determining the coefficient set for the subfilter comprises using a Taylor's series expansion based on the coefficient set of the nearest previous subfilter and the fractional part of the subfilter index.

10. The method of claim 1, wherein the packet read rate associated with the output data packets corresponds to a read-out rate from a buffer storing the output data packets.

11. The method of claim 1, further comprising using a phase-locked loop (PLL) or other control loop to maintain a fill level of a buffer storing the output samples within a predetermined range.

12. The method of claim 1, further comprising receiving, from a transmitting device, packets of the signal.

13. The method of claim 1, wherein the computing device is an audio device or a digital computing device.

14. The method of claim 1, wherein the signal comprises an audio signal or a band limited signal.

15. The method of claim 1, wherein the packet time stamps are generated based on the local clock of the computing device.

16. A computing device comprising:

one or more processors; and memory storing instructions that, when executed by the one or more processors, cause the computing device to:

determine, based on packet time stamps associated with input data packets of a signal, a packet write rate;

determine, based on a local clock of the computing device, a packet read rate associated with output data packets;

determine, based on a ratio of the packet write rate and the packet read rate, a rate control value; and generate, based on the rate control value, a first quantity of output samples in one or more output data packets based on a second quantity of input samples in one or more input data packets, wherein a rate of generation of the first quantity of output samples corresponds to the packet read rate.

17. The computing device of claim 16, wherein the instructions, when executed by the one or more processors, cause the computing device to determine the packet write rate by determining an average value of filtered differences between packet time stamps associated with consecutive input data packets of the signal.

18. The computing device of claim 16, wherein the instructions, when executed by the one or more processors, cause the computing device to determine the packet read rate by determining an average value of filtered time differences between clock values, of the local clock, at time instances when subsequent packets are read from a buffer.

19. A system comprising:

a receiving device configured to:

determine, based on packet time stamps associated with input data packets of a signal, a packet write rate;

determine, based on a local clock of the receiving device, a packet read rate associated with output data packets;

determine, based on a ratio of the packet write rate and the packet read rate, a rate control value; and generate, based on the rate control value, a first quantity of output samples in one or more output data packets based on a second quantity of input samples in one or more input data packets, wherein a rate of generation of the first quantity of output samples corresponds to the packet read rate; and a transmitting device configured to send the packets of the signal.

20. The system of claim 19, wherein the receiving device is configured to generate the first quantity of output samples by using a polyphase interpolator, and wherein generation of an output sample, of the first quantity of output samples, comprises:

determining a subfilter index of a subfilter based on the rate control value and an interpolation factor;

selecting a nearest previous subfilter, of the polyphase interpolator, based on an integer part of the subfilter index;

determining, based on a coefficient set of the nearest previous subfilter and a fractional part of the subfilter index, a coefficient set of the subfilter; and generating the output sample using the coefficient set of the subfilter.

* * * * *